(No Model.)
D. LOVEJOY.
BELT FASTENER.
No. 284,868. Patented Sept. 11, 1883.
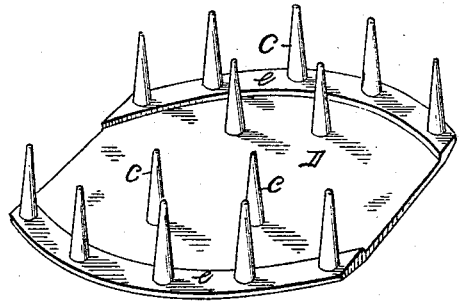
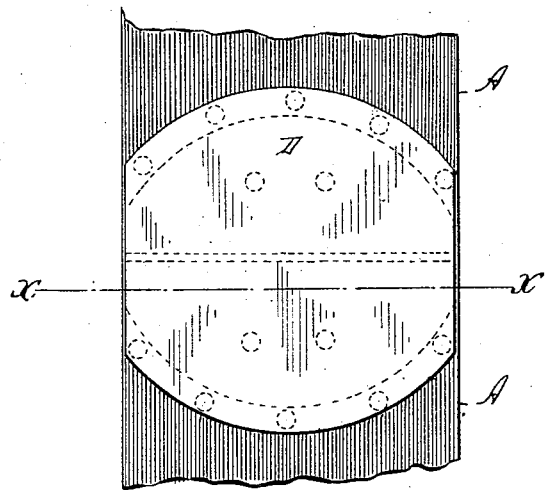
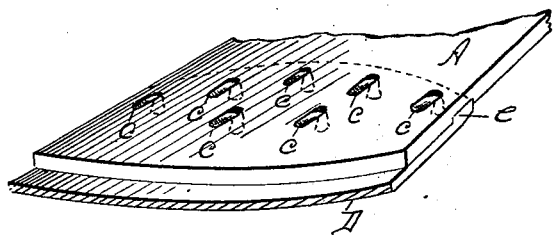
WITNESSES:
J. D. Garfield
M. C. Buck
INVENTOR
Daniel Lovejoy
BY Henry A. Chaffin
ATTORNEY

UNITED STATES PATENT OFFICE.

DANIEL LOVEJOY, OF LOWELL, MASSACHUSETTS.

BELT-FASTENER.

SPECIFICATION forming part of Letters Patent No. 284,868, dated September 11, 1883.

Application filed July 18, 1883. (No model.)

*To all whom it may concern:*

Be it known that I, DANIEL LOVEJOY, a citizen of the United States, residing at Lowell, in the county of Middlesex and State of Massachusetts, have invented new and useful Improvements in Belt-Fasteners, of which the following is a specification.

This invention relates to improvements in belt-fasteners, and to that class thereof consisting of a metallic plate provided with a series of teeth to pass through the belt and be clinched against its inner face, the object being to provide additional means other than the teeth, which conduce to give the fastener a much firmer hold upon the ends of the belt.

In the drawings forming part of this specification, Figure 1 is a perspective view of the under side of a belt-fastener constructed according to my invention. Fig. 2 is a plan view of the fastener, illustrating its appearance when attached to the ends of a belt. Fig. 3 is a sectional view, showing the fastener through line $x$ $x$, Fig. 2.

The plate D of the fastener and the teeth $c$ thereof are cast or otherwise made from metal of suitable ductility, all in one piece, to permit of clinching or riveting the teeth upon the belt without danger of breaking them, and allow of giving the fastening a certain form when it is finally prepared to run with the belt. The plate D is made with parallel side edges, but its ends are constructed of circular form, as shown, and under each of said ends, on the inner face of plate D, is formed a circular rib, $e$, projecting above that part of the plate between said ribs. The teeth $c$ are located in rows, as shown, upon each of said ribs $e$, and intermediately between the latter. The aforesaid circular form of the ends of the fastener makes it more easily conformable to the face of a crowning pulley, whereby the belt is given a better hold thereon, and the ribs $e$ on the plate are so forced into the belt, when the fastener is riveted to it, that it aids materially in an unyielding union of the belt and fastener, and prevents all of the tractional strain from being thrown upon the teeth $c$, and reduces the liability of the latter to tear out from the end of the belt.

Fig. 3 shows the relation of the belt and the rib $e$ when the belt and fastener are riveted together, and how the rib is embedded in the belt, as aforesaid. After the ends of a belt have been riveted to the fastener, as in Fig. 2, its parallel sides are bent downward, according to the amount of crown which the face of the pulley has on which it is to run, giving it a slight curve from side to side.

What I claim as my invention is—

A belt-fastener consisting of the plate D, provided with the ribs $e$ and the teeth $c$, substantially as set forth.

DANIEL LOVEJOY.

Witnesses:
J. H. GUILLET,
C. LUGIER.